United States Patent [19]

Greiner et al.

[11] 4,442,150

[45] Apr. 10, 1984

[54] FLEXIBLE TWO-DIMENSIONAL MATERIAL

[76] Inventors: Wolfgang H. A. Greiner, Wolfstr. 34; Magnus Mauch, J.Kerner-Str. 2, both of D-7320 Gppingen, Fed. Rep. of Germany

[21] Appl. No.: 326,334

[22] Filed: Dec. 1, 1981

[30] Foreign Application Priority Data

Oct. 20, 1980 [DE] Fed. Rep. of Germany ....... 3039520

[51] Int. Cl.³ .............................................. B32B 3/00
[52] U.S. Cl. ...................................... 428/53; 428/33; 428/911; 428/52; 29/469; 29/524; 29/521
[58] Field of Search ...................... 428/33, 52, 53, 911

[56] References Cited

U.S. PATENT DOCUMENTS

| | | | |
|---|---|---|---|
| 1,546,346 | 7/1925 | Mandalian | 428/911 X |
| 3,654,052 | 4/1972 | Rye | 428/52 |
| 3,746,602 | 7/1973 | Caroli et al. | 428/52 |

FOREIGN PATENT DOCUMENTS

| | | |
|---|---|---|
| 595979 | 4/1934 | Fed. Rep. of Germany . |
| 956482 | 1/1957 | Fed. Rep. of Germany . |
| 7136360 | 3/1972 | Fed. Rep. of Germany . |
| 7809889 | 4/1978 | Fed. Rep. of Germany . |
| 1245828 | 9/1971 | United Kingdom . |

*Primary Examiner*—P. Ives
*Attorney, Agent, or Firm*—Fred Philpitt

[57] ABSTRACT

The invention relates to a flexible two-dimensional material, as well as to a method and an apparatus for the production thereof.

6 Claims, 17 Drawing Figures

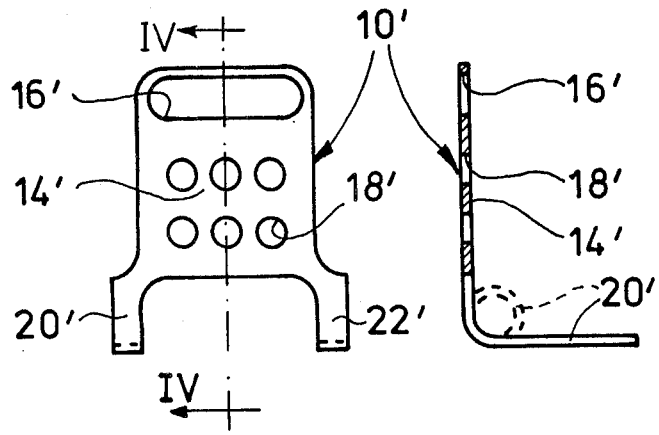
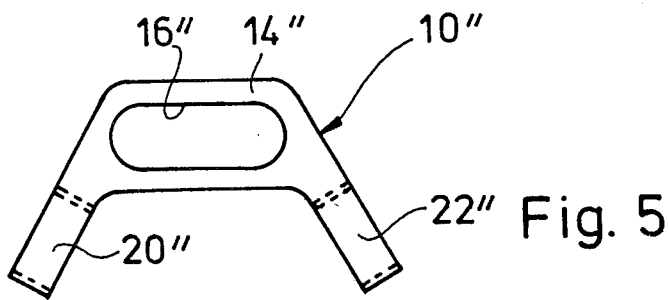
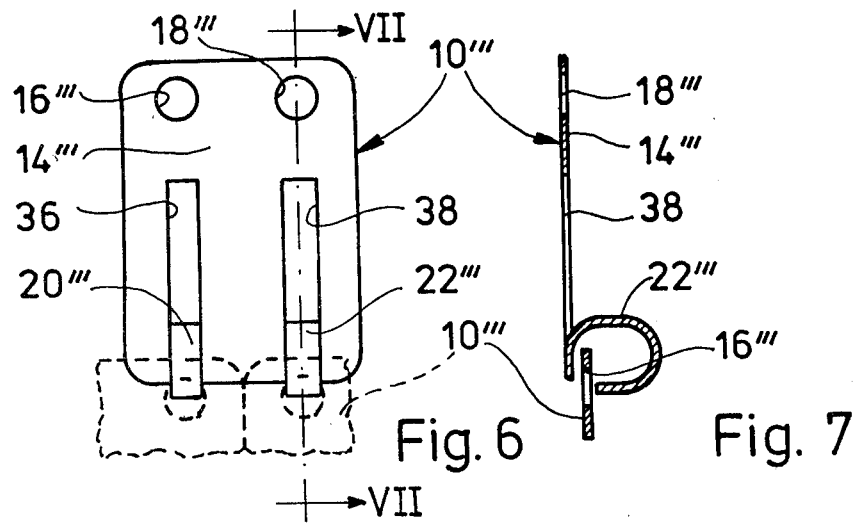

FLEXIBLE TWO-DIMENSIONAL MATERIAL

A material of the kind mentioned in the introductory parts of the claims is known from DE PS No. 5 95 979. It consists of two types of large square plates which are alternately arranged in a chess-board design. At the corners, the first plate type is provided with holes and the second plate type is provided with outwardly projecting lugs. Through adjacent holes in two plates of the first type there have been passed U-shaped stirrups, to the ends of which shims have been attached by bolts. The shims engage under the lugs of two plates of the second type at the considered lattice point.

Materials of this kind are used for protective armouring; the individual plates have a relatively long edge length. Although a protective armour thus has a number of individual plates and connection points that is easily surveyable, the assembly of the material from its components is complicated and time-consuming. A fine-link material, such as is required for the production of protective gloves, cannot be produced at a warrantable expenditure according to the principle just described.

From DE GM No. 78 09 889 there is furthermore known a flexible material which is constructed of individual rigid laminae, which are provided with several holes. Rings extend through adjacent holes of two adjacent laminae and thus hold the material together. This material, too, is difficult to assemble and is therefore expensive in production.

In DE PS No. 9 56 482, there is described a material which is flexible and is nevertheless protective against sharp objects, such as is used in practice for protective gloves. It consists of a plurality of small wire rings, whose diameter is approximately 3 mm in practice and whose wire thickness is approximately 0.2 mm. One ring is always simultaneously passed through two rings of a ring row adjacent in one direction and through two rings of a ring row adjacent in the other direction. Such a material provides a very good flexibility, but the production costs thereof are very high. Moreover, the material has virtually no dimensional stability and collapses in a pile of rings unless it is supported by a different element. This is disadvantageous for many applications: For example, it is impossible to put on a protective glove made of such a material without the aid of a second hand; and the protection against impact, shock and bombardment is also less good since the forces arising during stresses of this kind are not areally distributed.

The object of the present invention is to develop a material of the kind mentioned at the beginning in such a way that it can be produced simply and largely automatically, and even if for a fine-link material the dimensions of the individual links are small.

The material according to the invention consists of one-piece links which can be easily produced in large numbers by means of stamping, pressing, bending or die-casting and can be easily joined together in automatic machines. Thus, it is also possible to produce at low cost a fine-link material which can adapt itself to heavily curved contours, such as the surface of fingers. While maintaining the same principle of construction of the material, one can vary the extent of the desired flexibility thereof by the optional selection of the dimensions of the individual links.

The material according to the invention is very suitable for protecting parts of the body against cuts, thrusts, bombardment and impacts. It can be used both for armouring parts of clothing and for armouring entire garments, such as armoured jackets or protective gloves, and is also suitable for other armouring purposes, such as shoe socks, or for armouring vehicles. The material according to the invention is also suitable for other applications where a low-cost, impenetrable flexible material is required; for example, it can also serve for the production of a conveyor belt.

Hereinafter, the invention will be explained in more detail with the aid of some exemplified embodiments and with reference to the accompanying drawings, in which:

FIG. 3 shows a top view of a modified chain link for the production of a chain fabric;

FIG. 4 shows a section through the chain link shown in FIG. 3 along the line of intersection IV—IV therein;

FIG. 5 shows a top view of a further modified chain link for the production of a chain fabric;

FIG. 6 shows a top view of another modified chain link for the production of a chain fabric;

FIG. 7 shows a section through the chain link shown in FIG. 6 along the line of intersection VII—VII therein;

Figure 1:
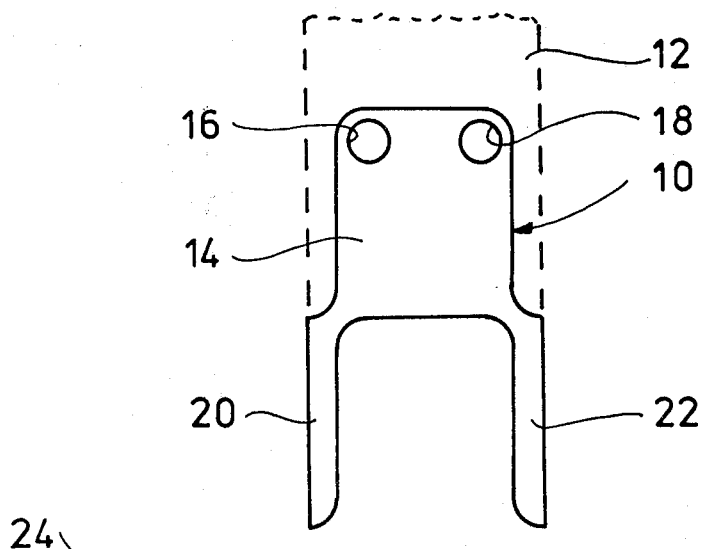
FIG. 1 shows a plane development of a chain link, from which a flexible chain fabric can be produced.

FIG. 1 shows a plane development of a chain link 10 for the production of a flexible chain fabric. The chain link 10 is initially obtained in the shown configuration by separating it from a continuous sheet-metal web 12 by means of stamping. The chain link 10 has a main section 14, in the upper end of which two circular reception holes 16, 18 have been punched symmetrically about the longitudinal axis. With the end of the main section 14 that is located at the bottom in FIG. 1 there are integrally formed two elongated connecting straps 20, 22, whose width is less than the diameter of the reception holes 16 and 18. The contour specified by the inner side of the connecting straps 20, 22 and the bottom edge of the main section 14 corresponds to the remaining outer contour of the main section 14 so that, apart from the material originally closing the reception holes 16 and 18, the chain links 10 can be produced from the sheet-metal web 12 without any waste.

In practice, the edge lengths of the main section 14 range from 4 to 8 mm if a fine-link chain fabric is to be produced, which is suitable, for example, for use in protective gloves.

Figure 2:
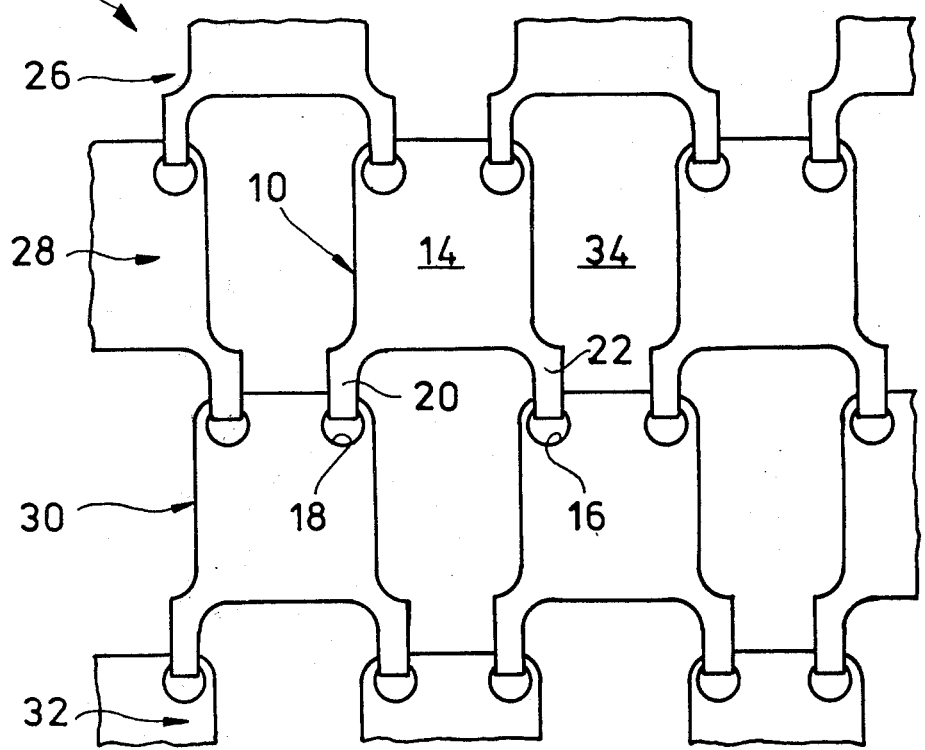
FIG. 2 shows a top view of a cut-out from a chain fabric which is contructed of chain links shown in FIG. 1.

FIG. 2 shows a two-dimensional chain fabric 24 which is composed of chain links 10. The chain links 10 are arranged in rows 26, 28, 30 and 32. Two successive rows of chain links 10 are always staggered by half a pitch. The connecting strap 20 of a chain link 10 always engages in a reception hole 18 of a chain link 10 located therebeneath, while the connecting strap 22 thereof engages in the reception hole 16 of the chain link 10 located in the row located therebeneath to the right of the chain link just mentioned, as can be seen in the drawing.

After having been introduced into the corresponding reception holes 16 and 18 of the chain links 10 located therebeneath, the connecting straps 20 and 22 have been closed so as to form loops so that there is obtained a permanent connection between the chain links 10 which is articulated in every direction. In order to simplify the production, the connecting straps 20, 22 are bent from the plane of the sheet-metal web 12 in a hook-like manner while the chain links 10 are stamped out so that, after the introduction of the connecting sections into the reception holes, the hooks only have to be closed to form loops. If a high tensile strength of the chain fabric 24 is required, then the ends of the connecting straps are provided with a hard-solder paste before they are closed to form loops, and after the closure of the connecting sections 20, 22 into loops, the chain fabric 24 is passed through a heating tunnel, in which the solder is caused to melt.

It can be clearly seen in FIG. 2 that clearances 34 are left between the individual chain links 10 in the chain fabric 24. In the chain fabric shown in FIG. 2, the clearances 34 have been chosen to be as large as possible. By shifting the reception holes 16, 18 in the direction of the longitudinal axis of the chain links, with the geometry of the chain links otherwise unchanged, one can reduce the clearances 34 as required. The smallest transversal dimension of the clearances 34 obviously corresponds to double the width of the connecting sections 20, 22.

In FIGS. 3 and 4, there is shown a chain link 10' for the production of a flexible chain fabric wherein, with an otherwise unchanged design, the two reception holes 16, 18 have been replaced by an elongated reception slot 16'. By this means, the flexibility of the chain fabric is increased, particularly in the direction that is vertical to the extension of the rows. Also for reasons of simplifying the punching of the reception slot 16' and with a view to reducing the weight, it is possible to use chain links 10' shown in FIGS. 3 and 4 instead of chain links 10 with separate reception holes 16 and 18.

If desired, one can reduce the weight of the chain links still further by providing the main section with additional openings which do not serve for joining the chain links together to form a chain fabric. Such additional openings are shown at 18' in FIG. 3; they do not have to be circular but may be, for example, slot-shaped.

In FIGS. 3 and 4, the connecting sections 20' and 22' are shown with end sections which have simultaneously been bent through 90° while the chain link 10' was stamped out and which can be easily hooked into the reception slots 16' by machine. The shape of the connecting strap 20' after it has been closed to form a loop is indicated in broken lines in FIG. 4.

The chain link 10" shown in FIG. 5 also has a single reception slot 16". The main element 14" has the shape of a relatively narrow web and there are integrally formed therewith two connecting straps 20" and 22" which are set at an angle of 60° and are diagrammatically indicated as having been preformed to an almost closed loop.

The chain links 10' and 10" shown in FIGS. 3 to 5 are assembled in exactly the same way as has been set forth above with reference to FIG. 2 in respect of the chain links 10.

In the chain link 10''' shown in FIGS. 6 and 7, there are again provided two reception holes 16''', 18''' in the main section 14'''. The connecting straps 20''' and 22''' have been cut from the main section 14''' and have been bent so that there are left corresponding slots 36, 38 in the main section 14'''. The connecting straps 20''' and 22''' are again somewhat narrower than the diameter of the reception holes 16''' and 18''' and, viewed in the direction of the axis of symmetry of the chain link 10''', are aligned with the reception holes. One can thus put the chain links 10''' as closely to one another as desired in the lateral direction, too, as is indicated in broken lines in FIG. 6. For a flush abutting contact in the lateral direction, the distance of the reception holes 16''', 18''' from the adjacent longitudinal edge of the main section 14''' has been chosen to equal a quarter of the width of the main section.

As can be seen in FIG. 7, as the connecting straps 20''', 22''' are bent from the main section 14''', they are pre-formed to almost closed loops, which can be easily closed by the exertion of pressure in the direction that is vertical to the plane of the main section 14'''.

Figure 8:
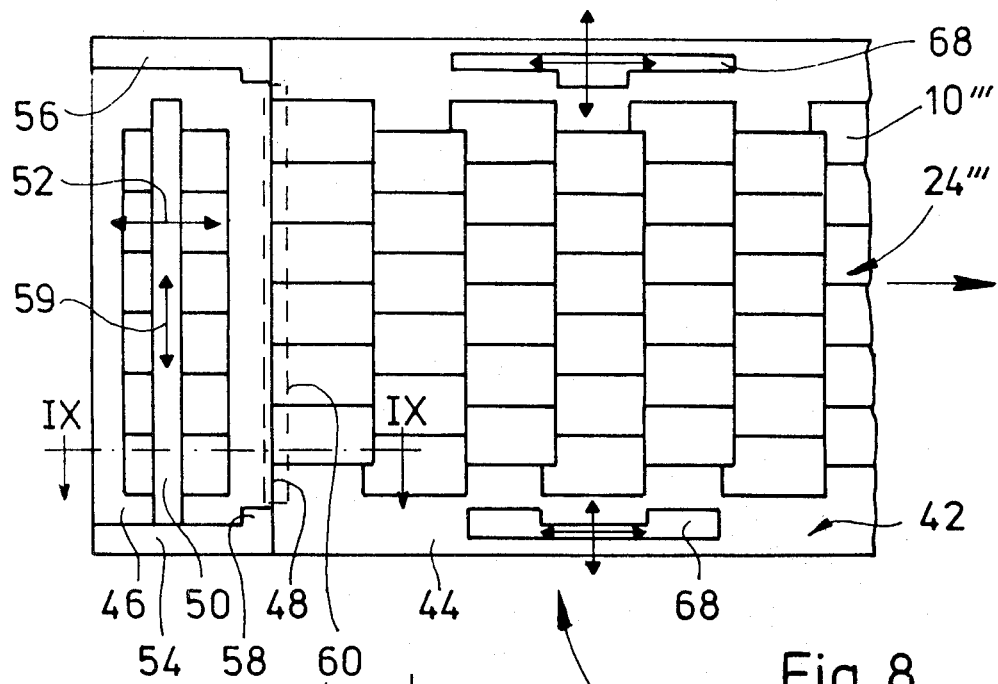
FIG. 8 shows a diagrammatical top view of an apparatus for joining together chain links so as to form a flexible chain fabric.

FIG. 8 diagrammatically shows a top view of a machine 40 for the automatic joining of chain links 10''' so as to form a flexible chain fabric 24''', in which the chain links 10''' overlap with their end sections in a scale-like manner. Details of the chain links 10''' have been omitted in FIG. 8 for the sake of clarity.

The machine 40 has a jointing table 42 with a delivery surface 44, which supports the chain fabric 24''', and a feeding surface 46 which is higher than the surface 44. Between these two surfaces there is located a step 48, the height of which is slightly greater than the thickness of the chain links 10'''.

To the left of the feeding surface 46, there is provided a stamping press (not shown), in which a whole row of chain links 10''', lying side by side, is separated from a sheet-metal web of corresponding width and the connecting sections 20''' and 22''' are brought into the shape shown in FIG. 7.

A strip-shaped conveyor head 50 takes over the whole row of laterally contiguous chain links 10''' in the stamping press and moves it from there on the feeding surface 46. For taking along the chain links, the conveyor head 50 has suction cups, to which a vacuum can be applied in a controlled manner, or electromagnets. Such driving means are known 'per se' and there is no need to describe them in detail herein.

The feed movement of the conveyor head 50 in the direction of the material delivery direction indicated by an arrow 52 occurs by the guidance of one of the faces of the conveyor head 50 on one of two guide strips 54, 56. The latter are provided with lugs 58 which limit the feed movement towards the step 48 when the reception holes 16''' and 18''' of a row of chain links 10''' carried by the conveyor head 50 are vertically aligned with the connecting straps 20''' and 22''' of the row of chain links joined last to the chain fabric 24'''. The rear edges of these last-mentioned chain links bear against the step 48 when the next row of chain links is attached.

The lateral spacing of the two guide strips 54 and 56 is greater than the length of the conveyor head 50 by half the width of a chain link 10'''. This allows this head to be moved to and fro on the delivery surface 46 in the direction of an arrow 59 so as to stagger the successive rows of chain links 10''' by half a pitch in each case. The position of the guide strips 54 and 56 can be set to the dimensions of the respective chain links used by means of an adjusting means not shown in detail in the drawing.

Above the step 48, there is provided a clamping bar 60 which is lowerable by a drive not shown in detail and which extends over a whole row of chain links 10'''.

Figure 9:
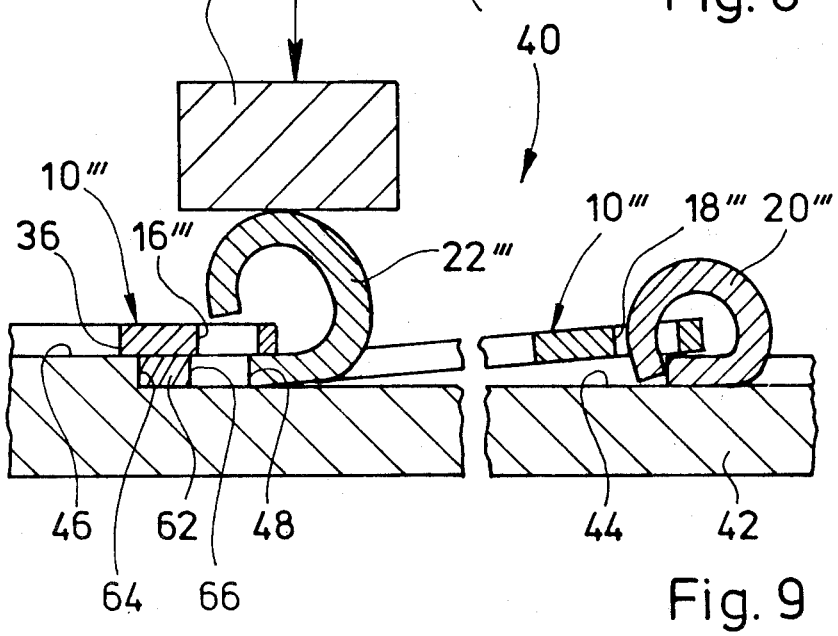
FIG. 9 shows a section through a portion of the apparatus shown in FIG. 8 along the line of intersection IX—IX therein on an enlarged scale.

FIG. 9 shows, on an enlarged scale, the geometrical ratios as a new row of chain links 10''' is joined to the end of the chain fabric 24'''. In the right-hand portion of FIG. 9, one discerns the connecting strap 20''', which has been bent so as to form a closed loop, of a chain link 10''' of the penultimate row of the chain fabric 24''', which strap extends through the hole 18''' in a chain link 10''' of the last row of the chain fabric 24'''. The rear edge of the last-mentioned chain link 10''' bears against the step 48.

The step 48 is formed by a lateral face of an inserted strip 62 which has been fixedly inserted into a recess 64 in the jointing table 42. Upstream of the step 48, as viewed in the direction of transportation of the chain fabric 24''', the inserted strip 62 has recesses 66, whose spacing corresponds to half the width of the chain links 10'''. In the design of the chain links 10''' shown in FIGS. 6 and 7, the recesses 66 are aligned with the reception holes 16''' and 18''' in the transversal direction, irrespective of whether the conveyor head 50 bears against the guide strip 54 or the guide strip 56. In a different geometry of the chain links, the recesses 66 either have to be extended in the transversal direction or there must be provided two sets of recesses 66 which are also staggered by half a pitch of the chain fabric. By exchanging the inserted strip 62, one can adapt the machine 40 for the assembly of chain links having a different geometry.

In FIG. 9, the conveyor head 50 has already been moved against the lug 58, and the front end of the row of chain links 10''' carried by the head lies above the rear end of the chain links of the rearmost row of the chain fabric 24''', and the reception holes 16''' and 18''' lie beneath the hook-like bent connecting straps 20''' and 22''' of the last chain link row of the chain fabric and above the recesses 66. By moving the clamping bar 60 downwards, the connecting straps 20''' and 22''' of the last chain link row of the fabric can now be moved through the reception holes 16''' and 18''' of the chain link row to be additionally joined and can enter the recesses 66.

When a new chain link row has been joined to the chain fabric by the downward movement of the clamping bar 60, this row is released by the conveyor head 48 and the latter returns to the stamping press for the reception of another row of chain links. At the same time, the chain material 24''' is moved further in the web longitudinal direction by one pitch so that now the rear edges of the newly joined chain links 10''' bear against the step 48. For this further movement of the chain fabric 24''' there is used a step drive (not shown) which drives special sprocket wheels or racks which co-operate with the serrated lateral edges of the chain fabric 24''' and which are diagrammatically indicated at 68 in FIG. 8.

Figure 10:
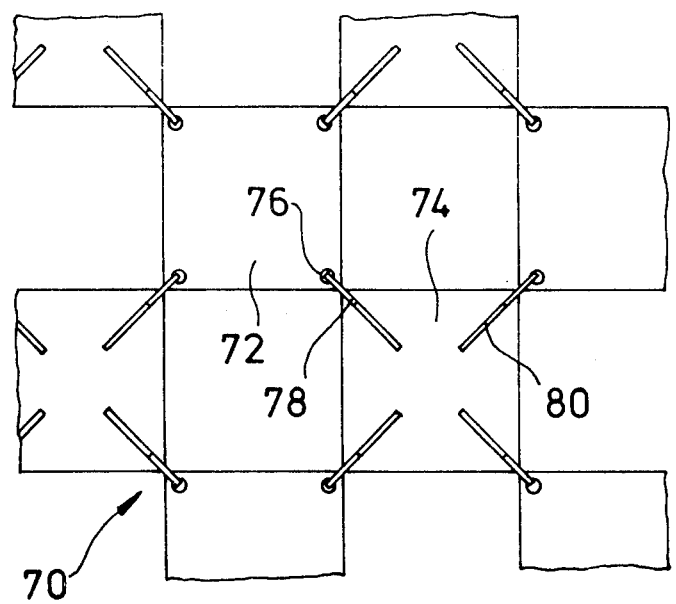
FIG. 10 shows a top view of a flexible chain fabric which is constructed of two different chain-link types.

FIG. 10 shows a modified chain fabric 70, in which two different types of square plate-shaped chain links 72 and 74 are arranged in a chess-board design. The chain links 72 have a reception hole 76 at each of their 4 corners, while 4 connecting straps 78 have been separated and bent from each of the chain links 74 in the diagonal direction so that corresponding slots 80 are left. The connecting straps 78 have the shape of closed loops which extend through the reception holes 76. Since the width of the connecting straps 78 is again smaller than the diameter of the reception holes 76, one again obtains a joint between the individual chain links 72 and 74 which is articulated in every direction.

FIGS. 11 to 14 show chain links 82, 82', 82'' and 82''' for the production of fine-link flexible chain fabrics which are bent from wire pieces. All these exemplified embodiments have in common that they comprise a hook-in section 84 and two connecting sections 86 (the reference symbols for the exemplified embodiments shown in FIGS. 12 to 14 are again appropriately provided with one to three apostrophes). The hook-in sections 84 and the connecting sections 86 are directly comparable with the reception holes 16 and 18 and the connecting straps 20 and 22 of the exemplified embodiments described above; the joining-together of the chain links so as to form a chain fabric can thus also be effected in a similar manner, as has been described in detail above.

Figure 11:
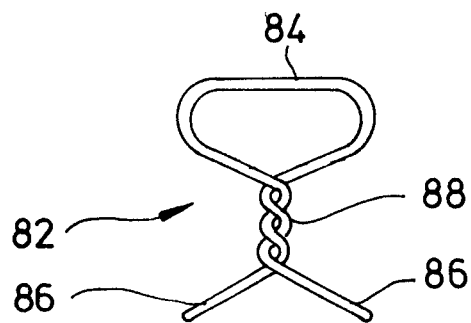
FIGS. 11 to 14 show top views of chain links for the production of a flexible chain fabric which are made of wire pieces by means of bending.

On the chain link 82 shown in FIG. 11, the hook-in section 84 is designed as an elongated closed oval which is separated by a twisting 88 from the connecting sections 86 which are designed as circular loops. The connecting sections 86 lie in planes which form an angle of 30° with the axis of the twisting 88 and are vertical on the plane of the hook-in section 84.

Figure 12:
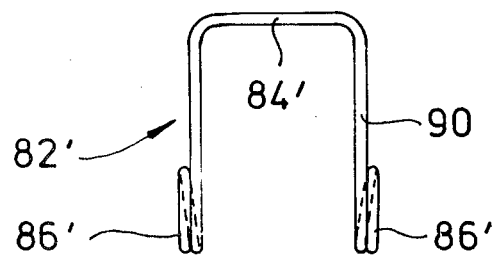

On the chain link 82' shown in FIG. 12, the hook-in section 84' is a rectilinear wire section, to the ends of which there are attached, via wire sections 90 extending vertically thereto, the connecting sections 86' which are designed as doubly coiled loops.

Figure 13:
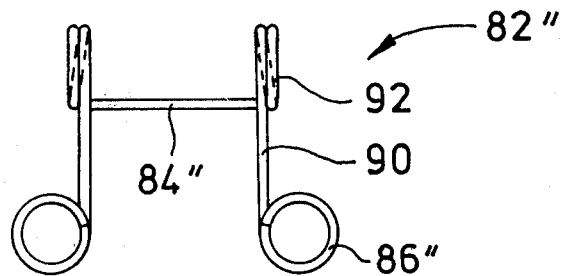

The chain link 82'' of FIG. 13 differs from the chain link 82' in that two doubly coiled hook-in loops 92 are provided on the ends of the rectilinear wire section 84'' so as to specify the hook-in point more precisely. Furthermore, the connecting sections 86' have been rotated through 90° relative to the connecting sections 86' and thus are vertical on the plane of the hook-in loops 92.

It is discernible that one can easily bend the chain links 82, 82' and 82'' from a single wire piece. By expanding the loop-shaped connecting sections or by permanently closing connecting sections which were initially not completely closed one can easily join the chain links together so as to form a chain fabric.

Figure 14:
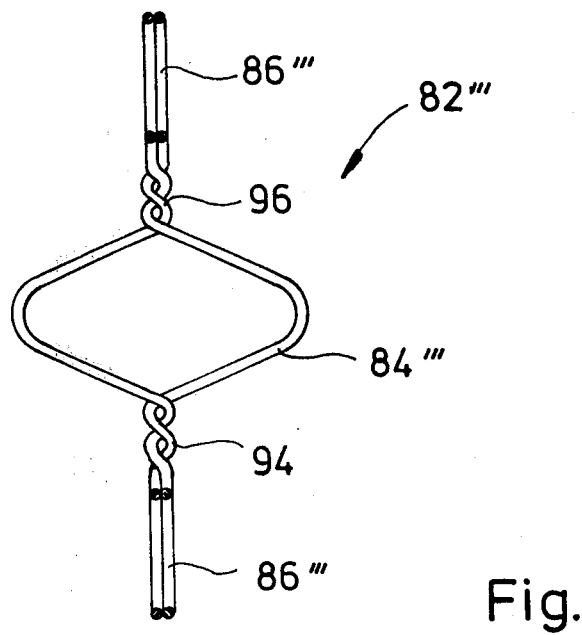

The chain link 82''' shown in FIG. 14 can be produced either from two wire pieces or from a single wire piece. The hook-in section 84''' is diamond-shaped and is connected to the connecting sections 86''' via a lower twisting 94 and an upper twisting 96. The plane of the connecting sections is vertical on the plane of the hook-in section 84'''. If the chain link 82''' is produced from a single wire piece, then one of the two connecting sections 86''' has a double-ply coil; when the production is from two wire pieces, the two connecting sections 86''' have two single-ply coils which are alignedly located one above the other.

Figures 15, 16:
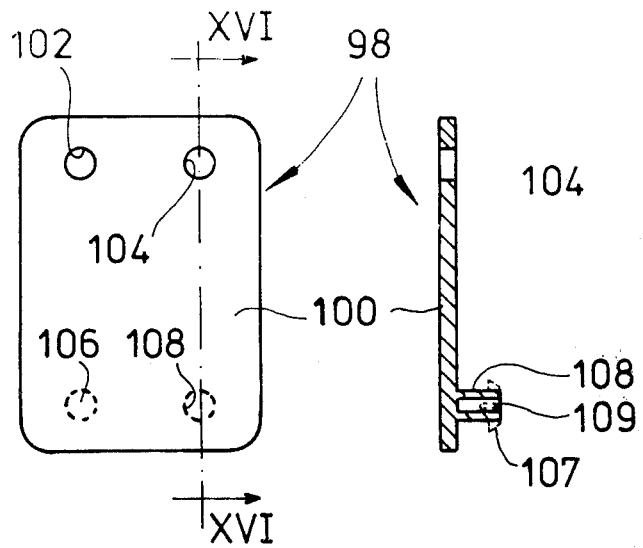
FIG. 15 shows a top view of a chain link made of plastics material for the production of a flexible chain fabric.
FIG. 16 shows a section through the chain link shown in FIG. 15 along the line of intersection XVI—XVI therein.

FIGS. 15 and 16 show a chain link 98 which is made of plastics material and which, as regards its function, is largely identical with the chain link 10''' shown in FIGS. 6 and 7. In the lamina-shaped main element 100 there are provided two reception holes 102, 104, while two tubular connecting sleeves 106, 108 are integrally formed with the main element 100 portion that is at the bottom in the drawing, at the geometrically equivalent points. The outside diameter of the connecting sleeves is smaller than the inside diameter of the reception holes 102 and 104.

During the assembly of the chain links 98 so as to form a chain fabric, the connecting sleeve 106 is introduced into the reception hole 104 of a chain link, which is located therebeneath in a staggered manner, of the next row and the connecting sleeve 108 is introduced into the reception hole 102 of the chain link, which is adjacent to the last-mentioned chain link, of the next row. Thereafter, the connecting sleeves 106 and 108 are expanded at their free ends, by using a mandrel-type tool, to a diameter which is larger than that of the reception holes 102 and 104. In this way, the chain links 98 are articulatedly connected in the chain fabric in a permanent manner.

As a particularly easily processable plastics material for the chain link 98 there may be used thermoplastics, which can be easily moulded into the desired shape and which allow the plastic deformation of the connecting sleeves 106, 108 to be easily performed by heated tools.

For higher requirements concerning the resistance to impact and wear of the chain fabric, it is also possible to use thermosetting plastics, more especially glass-fibre reinforced plastics materials. The individual chain links are then produced from the curable resin, which is provided with a filler, and the pre-form thus obtained is then dried to such an extent that there is provided—as regards the assembly into a chain fabric—a part which is dimensionally stable, is no longer sticky and, on the other hand, has not been fully cured. Following the assembly of the chain fabric from the individual chain links, which assembly is effected as described above and includes the step of plastically deforming the ends of the connecting sleeves 106, 108, the entire fabric is then moved through a tunnel kiln, in which the plastics material is cured. During this process, the chain fabric may be guided around corrugated deflection rollers so as to prevent the chain links from getting stuck at the points of contact.

Instead of a plastic deformation of the connecting sleeves 106 and 108, it is also possible to bring about a permanent articulated connection of the chain links 98 to one another in that the connecting sleeves 106, 108 are designed as spring elements, as is shown in broken lines in FIG. 16. Each of the connecting sleeves 106, 108 then has at its free end a collar 107, whose diameter is larger than the inside diameter of the reception holes 102 and 104. In the ends of the connecting sleeves 106, 108, there are then additionally provided slots 109 which are so wide that the collar 107 can be reduced, by elastic compression, to a diameter which is smaller than the inside diameter of the reception holes 102, 104.

If the chain link 98 is modified in such a way, the assembly of the chain links into a chain fabric can then simply be effected in that the connecting sleeves 106, 108 are frictionally introduced into the reception holes 102 and 104.

Figure 17:
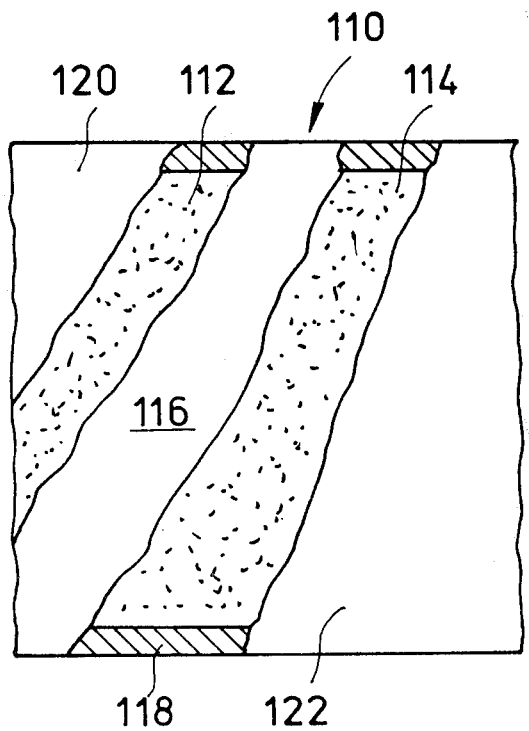
FIG. 17 shows a top view of a composite material for armouring purposes which consists of several plies of a flexible chain fabric and several plies of an elastic material, portions of the individual plies having been broken away.

FIG. 17 shows a composite armouring material 110 which comprises two chain fabric plies 112 and 114 which, with staggered chain links, are embedded in rubber at a spacing. The chain fabric plies 112 and 114 are thus separated by a central rubber ply 116 which is in communication with external rubber plies 120, 122 via material webs 118 on the edges.

Instead of rubber, it is also possible to use for the material layers 118 to 122 porous expanded materials which, when subjected to compression, are permanently deformed along with a dissipation of energy.

We claim:

1. A flexible two-dimensional material composed solely of a plurality of identical link members which are articulatedly connected directly to each other only by each other in a pattern of rows, wherein each of said links includes
   (1) two integrally formed connecting sections located in a first portion of each link, and
   (2) aperture means in another portion of each link located at a spaced distance away from the two connecting sections in that said link, said aperture means engaging with one connecting section from each of two adjacent links, each of the two connecting sections being in the form of a strap, the two straps of the two connecting sections being parallel to each other and the inner edge of each strap being aligned with the outer edge of the link of which it forms a part and the external edges of said straps being offset outwardly from the outer edges of the link of which it forms a part.

2. A flexible two-dimensional material according to claim 1 wherein the links of adjacent rows are always staggered by half a pitch.

3. A material as set forth in claim 1 or 2 wherein said aperture means comprises two separate spaced apart reception holes.

4. A material as set forth in claim 1 or 2 wherein said aperture means is in the form of an elongated reception hole.

5. A material as set forth in claim 1 or 2 wherein said links are produced from slab- or web-shaped material, and in that the straps are bent so as to form closed loops.

6. A flexible two-dimensional material consisting of a plurality of discrete laminar-shaped links which are arranged in a regular row pattern and are dimensionally stable within themselves and are articulately connected to one another, wherein each of the links comprises two integrally formed connecting sections at one end thereof and aperture means adapted to receive two connecting sections of two adjacent links at the other end thereof and the links of adjacent rows are always staggered by half a pitch and one connecting section of one of two adjacent links of the adjacent row engages in the aperture means of a link, the connection means being formed as straps which have been cut from a main section of the link and have been bent.

* * * * *